Dec. 24, 1929.  G. J. RIDERICH  1,740,835
GLARE SHIELD FOR EYEGLASSES
Filed Aug. 26, 1926
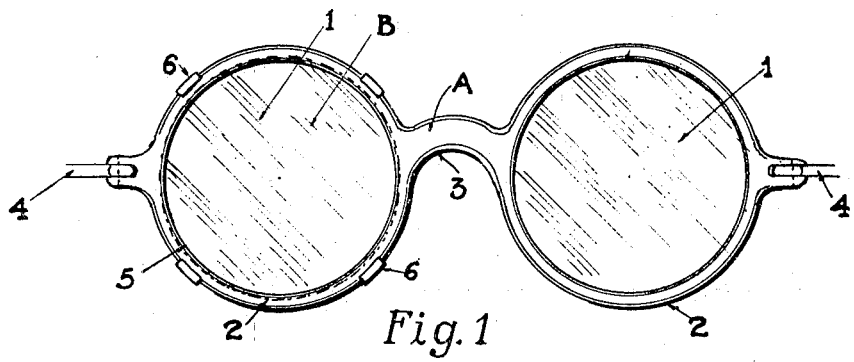
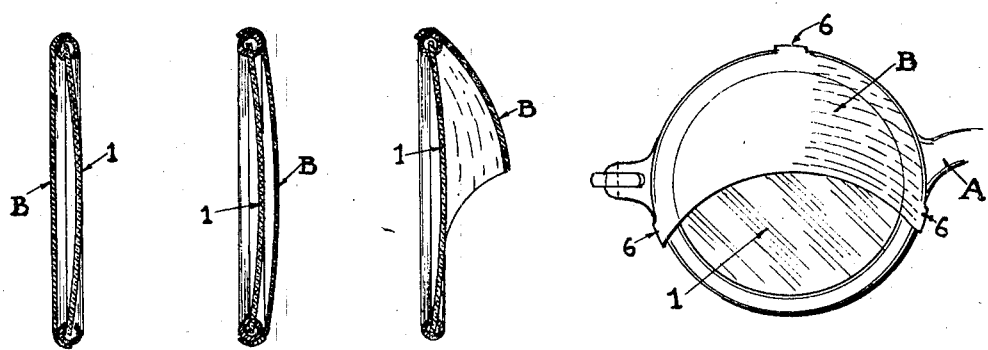
Fig. 2   Fig. 3   Fig. 4   Fig. 5
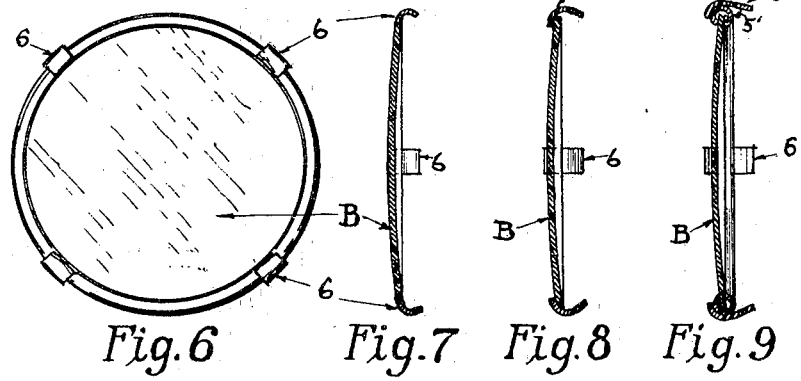
Fig. 6   Fig. 7   Fig. 8   Fig. 9
INVENTOR
GEORGE J. RIDERICH
BY
ATTORNEY Patented Dec. 24, 1929

1,740,835

UNITED STATES PATENT OFFICE

GEORGE J. RIDERICH, OF BROOKLYN, NEW YORK

GLARE SHIELD FOR EYEGLASSES

Application filed August 26, 1926. Serial No. 131,787.

This invention relates to eye-glasses or spectacles and comprises, as a separate article of manufacture, a glare eliminating attachment to such a structure which structure is provided with lenses adapted to the particular wearer.

The object of the invention is to provide means which with convenience, simplicity and small cost may be carried by the wearer and detachably secured to his own glasses to eliminate light glare. In carrying out the object of the invention, a glare shield preferably of non-breakable, transparent material, such as celluloid, is shaped to conform to the outer circumference of the eyeglass lens, and is provided with a group of several resiliently spreadable fingers spaced in groups so as to grasp the outer rim of the eyeglass lens and subtend more than one-half of its periphery, so that the shield is positively held against all parallel plane movement relatively to the eyeglass lens but is free to snap into position in response to a simple finger pressure, exerting a face towards face movement between the shields and the lens.

The above and further objects of the invention will better be understood by reference to the illustrative embodiments of my invention, to which the following claim is directed solely for purposes of illustration and not limitation.

These embodiments, described in the following specification, are illustrated in the accompanying drawing, which forms a part hereof, in which like characters designate corresponding parts in the several figures.

In the figures, Fig. 1 is a front view of a pair of spectacles, illustrating one of my glare shields applied to one lens thereof;

Fig. 2 is a cross section of the shield as applied in Fig. 1, through diametrically opposite gripping fingers 6 of Fig. 1.

Fig. 3 is a similar cross-section illustrating a modified form;

Fig. 4 is a similar section illustrating another modification;

Fig. 5 is a front view showing a modification of Fig. 4;

Fig. 6 is a front view with the eye-glasses removed showing the structure of Figs. 1 and 2;

Fig. 7 is a view corresponding to Fig. 2 with the eye-glasses removed showing a modification of the gripping fingers;

Fig. 8 shows a further modification of the gripping fingers;

Fig. 9 shows another modification of the gripping fingers.

A indicates a popular form of structure for mounting and wearing a pair of eye-lenses 1—1, known as spectacles which in the form shown have the frames 2 actually mounting the lenses 1, and a cross-connecting nose bridge 3. Ear bows 4 are also indicated.

Essentially in the manufacture of my invention a wall part B, is provided and so fabricated and fitted as to be detachably securable to the rim 5 of each eye glass lens 1, it being understood that I use the expression rim 5 to indicate the outer part be it frame structure or eye glass structure.

In Figures 1, 2, 6, 7, 8 and 9, the wall parts B, B³, B⁴ and B⁵ are to be located between the lens 1, and the eye of the wearer.

In the structure of Figures 1, 2, 6, 7 and 8, this wall part is a disk of celluloid of a peripheral contour corresponding in size and configuration to the lens with which it is adapted to be used.

Thus it may be circular, oval or in fact of any configuration. The celluloid is suitably colored to eliminate the glare—amber colored or blue or green. In Figs. 1, 2, 6 and 7, a plurality of bendable, in these cases resilient gripping fingers 6 are formed integrally with the wall part and are adapted to extend across and as a group grasp or grip the outer periphery of the eye-glass lens. In Figs. 1, 2 and 6 these fingers extend substantially straight out from the wall part, as it has been found that little or no tendency for the wall part to be displaced from the eye-lens is present, when the wall part is located between the lens and the face of the wearer. However, if desired and as is shown in Figs. 7 and 8, these gripping fingers may be bent inwardly at the ends more positively to grip about the eye glass periphery. When fabricated as shown in Figs. 7 and 8, the glare shield goes on and off with a sort of snap action, whereas as shown in Figs. 1, 2 and 6, the grasping of the group of fingers has less of a snap action, more nearly a frictional grasping. It is preferred, however, that the fingers which are spreadably resilient, be so shaped as to grasp the periphery of the lens somewhat positively, as best indicated in Figs. 3 and 6, but in no event to constitute hooks requiring a sliding action of the glare shield relatively to the lens for disengagement.

In Fig. 8, fingers 6″ unlike fingers 6 and 6′ are not integral with the wall part, but are cemented thereto.

In Fig. 9, the wall part B⁴ may be colored glass framed in its own small frame 5′ to which are secured a plurality of resilient bendable fingers 6‴.

In Figs. 4 and 5, however, only three gripping fingers are shown, arranged, so that the total amount embraced is little more than half of the periphery of the eye-glass. This can be true for all configurations of the wall part B. However, in these Figs. 4 and 5, the wall part is shown as a visor or hood outstanding from the lens 1 and readily functionable by a tilt of the wearer's head, either to come into play as a glare shield or to be tilted out of the line of vision.

In Fig. 3, the wall part B′ is shown located on the outside of the lens 1, which is an intended position likewise for all other forms of the wall part. In fact, the wall part may be concave or convex, a complete disc, or a portion of a disc, and even visor-like, as shown in Figs. 4 and 5 to be within the scope of my invention.

It is important to note that this invention requires the equivalent of several, that is, three or more gripping fingers arranged so that the two extreme fingers relatively to an intermediate finger subtend more than one-half the periphery of the eye-glass lens. In Fig. 5 there is shown how three gripping fingers subtend or substantially embrace more than one-half the periphery of the eye-lens and effect an interlock by means of the gripping fingers. Fig. 1 shows how four fingers accomplish this purpose, although it is not to be understood that the three finger grip of Fig. 5 is limited to the vise-shaped construction for the glare shield as shown in Figs. 4 and 5.

What I claim and desire to secure of U. S. Letters Patent is:

A detachable glare shield of transparent material colored to subdue the glare of light for an eyeglass or spectacle lens having several resilient, resiliently spreadable gripping fingers spaced about the periphery of said shield so that more than one-half the circumference of the periphery of said lens is subtended by three of said fingers, each said finger being so shaped and said several fingers being so spaced and grouped as first to engage then to spread and then to grasp said lens as a cooperative group, prevent all parallel plane movement between said lens and said shield but permit a face towards face approach of said shield and said lens and effect an automatic resilient spreading and subsequent gripping of said gripping fingers without individual manipulation.

In witness whereof, I have signed my name to this specification, this 19th day of August, 1926.

GEORGE J. RIDERICH.